Patented Dec. 7, 1943

2,336,270

UNITED STATES PATENT OFFICE 2,336,270

TREATMENT OF GLADIOLUS CORMS

George E. Lynn and Fred W. Fletcher, Midland, Mich., assignors to The Dow Chemical Company, Midland, Mich., a corporation of Michigan No Drawing. Application June 18, 1941, Serial No. 398,548

4 Claims. (Cl. 47—58)

The present invention is concerned with a method for improving the blooming properties of gladioli and is particularly directed to increasing the yield of marketable blooms by treating gladiolus corms prior to planting.

Among the problems associated with the commercial growing of gladioli is that of obtaining a maximum number of marketable spikes during the normal blooming season of the plant. Many otherwise desirable varieties are not commercially practicable because of their poor blooming characteristics. It is an object of the present invention to increase the blossom productivity of gladiolus.

We have discovered that the blooming properties of many varieties of gladioli are materially improved by the treatment of the cured galiolus corms with methyl bromide prior to planting. This treatment is conveniently carried out by fumigating the corms prior to planting whereby a stimulation is accomplished resulting in the production of gladiolus plants which yield many more marketable flower spikes than are obtained from untreated corms. As an incidental result, thrips and other insect pests are substantially eliminated from the corms whereby the parasite population of the gladiolus plants and blooms is materially reduced. The methyl bromide treatment has no apparent effect upon the viability of the corms.

In carrying out the invention the corms are introduced into any suitable fumigating chamber and subjected to the methyl bromide vapors. The optimum concentration of the fumigant employed and the duration of the treatment varies with the particular variety of gladiolus concerned. As little as 0.5 pound of methyl bromide per 1000 cubic feet has been found to give the desired result and as much as 5 pounds per 1000 cubic feet has been employed without injury to the corms. The amounts are not critical and somewhat greater or lesser concentrations of methyl bromide may be employed with more or less hardy varieties. The period of exposure varies somewhat with the concentration of methyl bromide employed. Generally from about 2 to 5 hours treatment is sufficient.

In one representative treatment the corms of 6 varieties of gladiolus were fumigated with methyl bromide. 5 lots of each variety, each lot containing 75 corms, were employed. One lot of each variety was employed as a control. The remaining 4 lots were subjected to treatment with methyl bromide at 1.5 and 2 pounds per 1000 cubic feet for 5 hours exposure period and at 2 and 2.5 pounds per 1000 cubic feet for 3 hours exposure period. All treatments were made at 70° F. and at a relative humidity of 40 per cent. A substantially complete control of thrip infestation was observed for each lot of fumigated corms.

The fumigated and check corms were then planted side by side in a randomized plot on uniform sandy loam. No significant difference between the viability of the treated and untreated corms was observed. The number of blooms put forth by the plants growing from the corms of each lot was tallied throughout the growing season. The following table sets forth the results with respect to yield in terms of marketable flower spikes:

Table

| Variety | 1.5# methyl bromide per 1000 cubic feet for 5 hours | 2.0# methyl bromide per 1000 cubic feet for 5 hours | 2.0# methyl bromide per 1000 cubic feet for 3 hours | 2.5# methyl bromide per 1000 cubic feet for 3 hours | Control |
|---|---|---|---|---|---|
| Cara Mia | 125 | 137 | 125 | 156 | 91 |
| Gold Eagle | 166 | 155 | 114 | 138 | 95 |
| Break o' Day | 51 | 35 | 69 | 61 | 37 |
| Pride of Wanakah | 43 | 28 | 28 | 27 | 7 |
| Alice Tiplady | 133 | 116 | 185 | 121 | 15 |
| Golden Dream | 9 | 25 | 22 | 28 | 12 |

We claim:

1. A process for improving the blooming of gladioli comprising the steps of fumigating the cured gladiolus corms for a period of time and with a concentration of methyl bromide sufficient to cause stimulation but insufficient to injure the corms, and thereafter planting the corms.

2. A process for improving the blooming of gladioli comprising the steps of fumigating the cured gladiolus corms with methyl bromide at a concentration between 0.5 pound per 1,000 cubic feet and the maximum tolerated by the particular variety of gladioli under treatment, and thereafter planting the corms.

3. A process for improving the blooming of gladioli comprising the steps of fumigating the cured gladiolus corms with methyl bromide at a concentration between 0.5 and 5 pounds per 1,000 cubic feet.

4. A process for improving the blooming of gladioli comprising the steps of fumigating the cured gladiolus corms with methyl bromide at a concentration between 0.5 and 5 pounds per 1,000 cubic feet for an exposure period not to exceed 5 hours and varying inversely with the concentration of methyl bromide employed.

GEORGE E. LYNN.
FRED W. FLETCHER.